US011146649B2

(12) United States Patent
Knoulich et al.

(10) Patent No.: US 11,146,649 B2
(45) Date of Patent: Oct. 12, 2021

(54) COMPUTER-IMPLEMENTED METHOD AND COMPUTER SYSTEM FOR DISTRIBUTING PUSH NOTIFICATIONS

(71) Applicant: Quadient Group AG, Appenzell (CH)

(72) Inventors: Jan Knoulich, Hradec Kralove (CZ); Petr Novotny, Prelouc (CZ); Vladimir Jirak, Kostelec na Hané (CZ); Antoine Hemon-Laurens, Nantes (FR)

(73) Assignee: QUADIENT GROUP AG, Appenzell (CH)

( * ) Notice: Subject to any disclaimer, the term of this patent is extended or adjusted under 35 U.S.C. 154(b) by 47 days.

(21) Appl. No.: 15/804,987

(22) Filed: Nov. 6, 2017

(65) Prior Publication Data

US 2018/0131782 A1  May 10, 2018

(30) Foreign Application Priority Data

Nov. 7, 2016 (CH) .................................. 01473/16

(51) Int. Cl.
*H04L 29/08* (2006.01)
(52) U.S. Cl.
CPC .............. *H04L 67/26* (2013.01); *H04L 67/20* (2013.01); *H04L 67/10* (2013.01)
(58) Field of Classification Search
CPC .......... H04L 67/26; H04L 67/20; H04L 67/01
USPC ....................................................... 709/217
See application file for complete search history.

(56) References Cited

U.S. PATENT DOCUMENTS

| | | | | |
|---|---|---|---|---|
| 10,212,104 | B1* | 2/2019 | Bhatt | H04L 51/02 |
| 2012/0303774 | A1* | 11/2012 | Wilson | H04L 67/26 |
| | | | | 709/223 |
| 2012/0307656 | A1* | 12/2012 | Vyrros | H04L 12/1859 |
| | | | | 370/252 |
| 2012/0324041 | A1* | 12/2012 | Gerber | H04L 67/26 |
| | | | | 709/217 |
| 2013/0024690 | A1* | 1/2013 | Bhagavatula | H04L 67/28 |
| | | | | 713/168 |

(Continued)

OTHER PUBLICATIONS

Extended European Search Report issued in European Patent Application No. 17199302.5, dated Mar. 27, 2018.

*Primary Examiner* — Kevin T Bates
*Assistant Examiner* — Chen-Liang Huang
(74) *Attorney, Agent, or Firm* — Knobbe, Martens, Olson & Bear, LLP

(57) ABSTRACT

A computerized push notification distribution system, receives a registration message from a third party application executing on a user's communication device. The registration message includes a push notification service registration identifier from a push notification server and a user identifier of the user. The computerized push notification distribution system stores the push notification service registration identifier and the user identifier linked to the third party application. Upon receiving from a third party a message content for a push notification to users of the third party application, the computerized push notification distribution system generates and transmits to the push notification server a request for transmitting a push notification, for each notification service registration identifier linked to the third party application, each request includes the message content for the push notification and the respective notification service registration identifier.

16 Claims, 2 Drawing Sheets

(56) References Cited

U.S. PATENT DOCUMENTS

| | | |
|---|---|---|
| 2013/0084896 A1 | 4/2013 | Barkie et al. |
| 2016/0198645 A1* | 7/2016 | Weatherill ............. A01G 25/16 700/284 |
| 2016/0219083 A1* | 7/2016 | Gangadharan ........ H04L 67/145 |
| 2019/0104190 A1* | 4/2019 | Justin ...................... H04L 67/26 |

* cited by examiner ively and relatively straightforward ways for third parties (i.e. non-manufacturers of devices and/or operating systems), including application developers and/or service providers, to distribute messages to their customers and/or partners, the use of push notifications for reliable communication of content or "payload" from companies or firms to their customers or partners has not found widespread application, particularly because of the large variety of brands and types of user communication devices and the different types and versions of operating systems running on these devices, and further because one user may have several different communication devices with different operating systems.

COMPUTER-IMPLEMENTED METHOD AND COMPUTER SYSTEM FOR DISTRIBUTING PUSH NOTIFICATIONS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates to a computer-implemented method and a computer system for distributing push notifications. Specifically, the present disclosure relates to a computer-implemented method of distributing push notifications, a computerized push notification distribution system, and a communication device for receiving push notifications.

Background

Push notification services are implemented by and available from various providers such as Apple®, Google® or Microsoft®. Push notification services such as Apple® Push Notification Service, Google® Cloud Messaging (GCM), or Windows® Push Notification Service (WNS), etc., enable third party application developers to send notification data or information from developer run servers to applications installed on communication devices, particularly mobile communication devices. The content or "payload" of push notification services includes badges, sounds, newsstand updates, custom texts, custom text alerts, raw updates, etc. Although push notifications and related push notification services would be efficient and relatively straightforward ways for third parties (i.e. non-manufacturers of devices and/or operating systems), including application developers and/or service providers, to distribute messages to their customers and/or partners, the use of push notifications for reliable communication of content or "payload" from companies or firms to their customers or partners has not found widespread application, particularly because of the large variety of brands and types of user communication devices and the different types and versions of operating systems running on these devices, and further because one user may have several different communication devices with different operating systems.

SUMMARY

One object of the present disclosure is to provide a computer-implemented method of distributing push notifications and a computerized push notification distribution system, which method and system do not have at least some of the disadvantages of the prior art. In particular, it is an object of the present disclosure to provide a computer-implemented method of distributing push notifications and a computerized push notification distribution system, which method and system make it possible to use push notifications for efficient communication of content or "payload" from application providers to a plurality of users of the providers' applications.

According to the present disclosure, these objects are achieved through the features of the independent claims. In addition, further advantageous embodiments follow from the dependent claims and the description.

According to the present disclosure, the above-mentioned objects are particularly achieved in that a computer-implemented method of distributing push notifications comprises: receiving at a user's communication device from a push notification server a push notification service registration identifier, responsive to the user activating push notifications for a third party application implemented on the user's communication device; transmitting, by the third party application implemented on the user's communication device, a registration message to a computerized push notification distribution system, the registration message including the push notification service registration identifier and a user identifier of the user; storing by the computerized push notification distribution system the push notification service registration identifier and the user identifier linked to the third party application; receiving at the computerized push notification distribution system from the third party a message content for a push notification to users of the third party application; and transmitting from the computerized push notification distribution system to the push notification server a request for transmitting a push notification, for each notification service registration identifier linked to the third party application, each request for transmitting a push notification including the message content for the push notification and the respective notification service registration identifier. The computerized push notification distribution system makes it possible to distribute efficiently message content from third parties to a plurality of users and their plurality of devices registered for push notifications to applications of the third parties.

In an embodiment, the method further comprises: receiving at the computerized push notification distribution system, from the push notification server, access confirmations indicative of user access to a push notification, each access confirmation including the notification service registration identifier included in the push notification accessed by a user; and storing by the computerized push notification distribution system, for the push notification accessed by the user, a notification receipt for the user identifier linked to the notification service registration identifier. The computerized push notification distribution system makes it possible to track user access to message content issued by third parties to their applications via push notifications.

In a further embodiment, the computerized push notification distribution system receives registration messages from the third party application implemented on a plurality of communication devices of the user. The computerized push notification distribution system transmits to the push notification server a plurality of requests, for transmitting the push notification to the plurality of communication devices of the user.

In an embodiment, the computerized push notification distribution system receives registration messages from a plurality of different third party applications implemented on the user's communication device.

In a further embodiment, the computerized push notification distribution system receives message contents from a plurality of third parties for push notifications to users of respective third party applications of the plurality of third parties.

In an embodiment, the computerized push notification distribution system stores notification receipts for a plurality of users, a plurality of third party applications, and/or a plurality of third parties.

In a further embodiment, the user's communication device receives push notification service registration identifiers from a plurality of push notification servers, responsive to the user activating the push notifications for the third party application implemented on the user's communication device. The third party application implemented on the user's communication device includes in the registration message to the computerized push notification distribution system the plurality of push notification service registration identifiers received. The computerized push notification distribution system stores the plurality of push notification service registration identifiers linked to the user identifier and the third party application. The computerized push notification distribution system transmits the request for transmitting the push notification to the plurality of push notification servers, for each notification service registration identifier linked to the third party application.

In addition to the computer-implemented method of distributing push notifications, the present disclosure also relates to computerized push notification distribution system, comprising a processor configured to execute the steps: receiving, from a third party application executing on a user's communication device, a registration message, the registration message including a push notification service registration identifier from a push notification server and a user identifier of the user; storing the push notification service registration identifier and the user identifier linked to the third party application; receiving from the third party a message content for a push notification to users of the third party application; generating and transmitting to the push notification server a request for transmitting a push notification, for each notification service registration identifier linked to the third party application, each request for posting a push notification including the message content for the push notification and the respective notification service registration identifier.

In an embodiment, the processor is further configured to receive, from the push notification server, access confirmations indicative of user access to a push notification, each access confirmation including the notification service registration identifier included in the push notification accessed by a user; and to store for the push notification accessed by the user a notification receipt, for the user identifier linked to the notification service registration identifier.

In a further embodiment, the processor is configured to receive registration messages from the third party application implemented on a plurality of communication devices of the user, and to transmit to the push notification server a plurality of requests, for transmitting the push notification to the plurality of communication devices of the user.

In an embodiment, the processor is configured to receive registration messages from a plurality of different third party applications implemented on the user's communication device.

In a further embodiment, the processor is configured to receive message contents from a plurality of third parties, for push notifications to users of respective third party applications of the plurality of third parties.

In an embodiment, the processor is configured to store notification receipts for a plurality of users, a plurality of third party applications, and/or a plurality of third parties.

In a further embodiment, the processor is configured to receive included in the registration message from the third party application executing on the user's communication device a plurality of push notification service registration identifiers; to store the plurality of push notification service registration identifiers linked to the user identifier and the third party application; and to transmit the request for transmitting the push notification to the plurality of push notification servers, for each notification service registration identifier linked to the third party application.

In addition to the computer-implemented method of distributing push notifications and the computerized push notification distribution system, the present disclosure also relates to a communication device, comprising a processor configured to execute the steps: receiving, from a user of the communication device, activation instructions for activating push notifications for a third party application implemented on the communication device; transmitting to a push notification server an activation of the push notifications for the third party application implemented on the communication device; receiving from the push notification server a push notification service registration identifier, responsive to the activation of the push notifications for the third party application; transmitting, by the third party application implemented on the user's communication device, a registration message to a computerized push notification distribution system, the registration message including the push notification service registration identifier and a user identifier of the user; and receiving from the computerized push notification distribution system a push notification for the third party application, the push notification including a message content transmitted by a third party to the computerized push notification distribution system for users of the third party application who have activated push notifications for the third party application.

In an embodiment, the processor is further configured to transmit, to the computerized push notification distribution system, an access confirmation, responsive to the user accessing a push notification, the access confirmation including the notification service registration identifier included in the push notification accessed by the user.

BRIEF DESCRIPTION OF THE DRAWINGS

The present disclosure will be explained in more detail, by way of example, with reference to the drawings in which.

DETAILED DESCRIPTION OF THE PREFERRED EMBODIMENT

Figure 1:
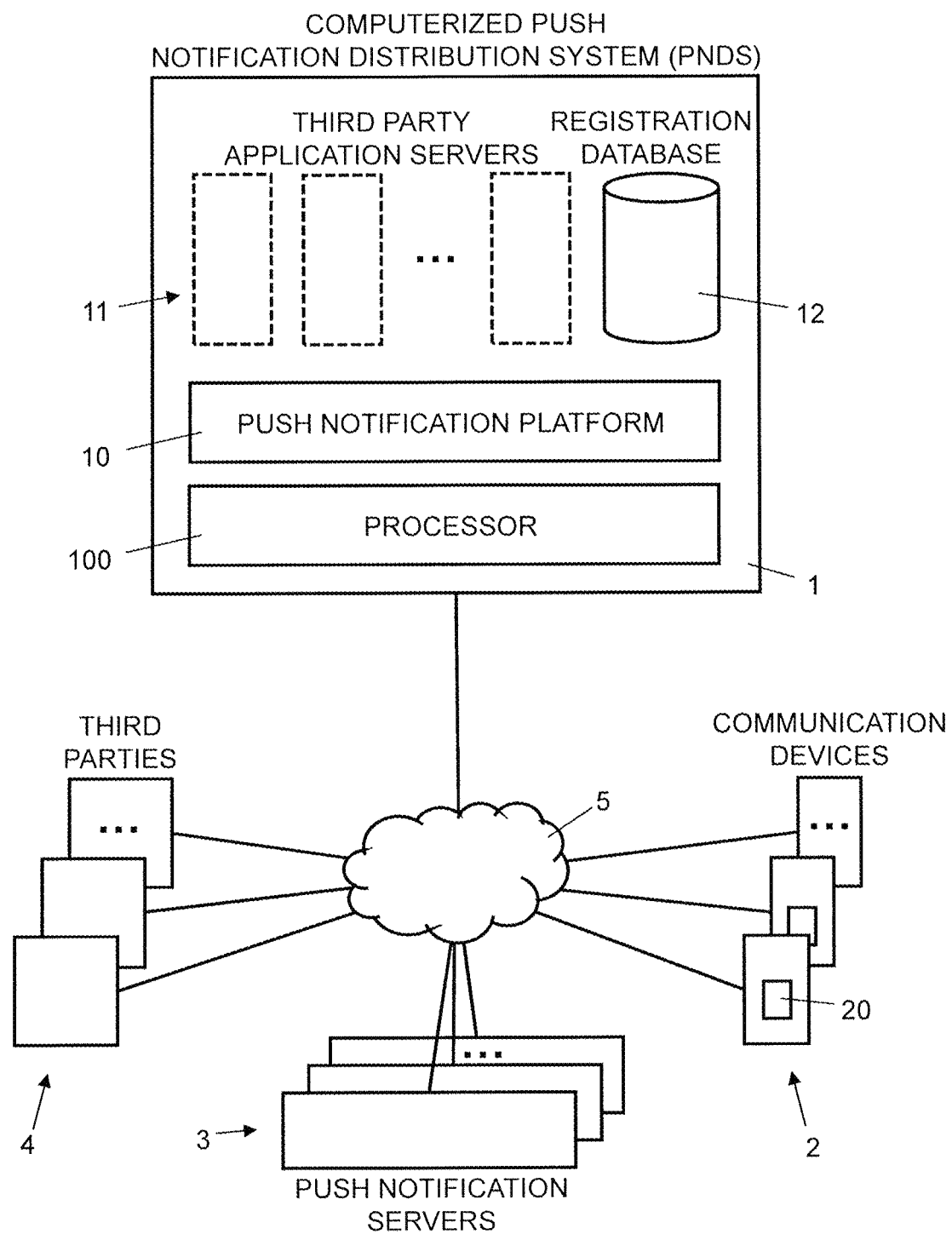
FIG. 1: shows a block diagram illustrating schematically a computerized push notification distribution system communicating via a communication network with third parties, push notification servers, and communication devices.
Figure 2:
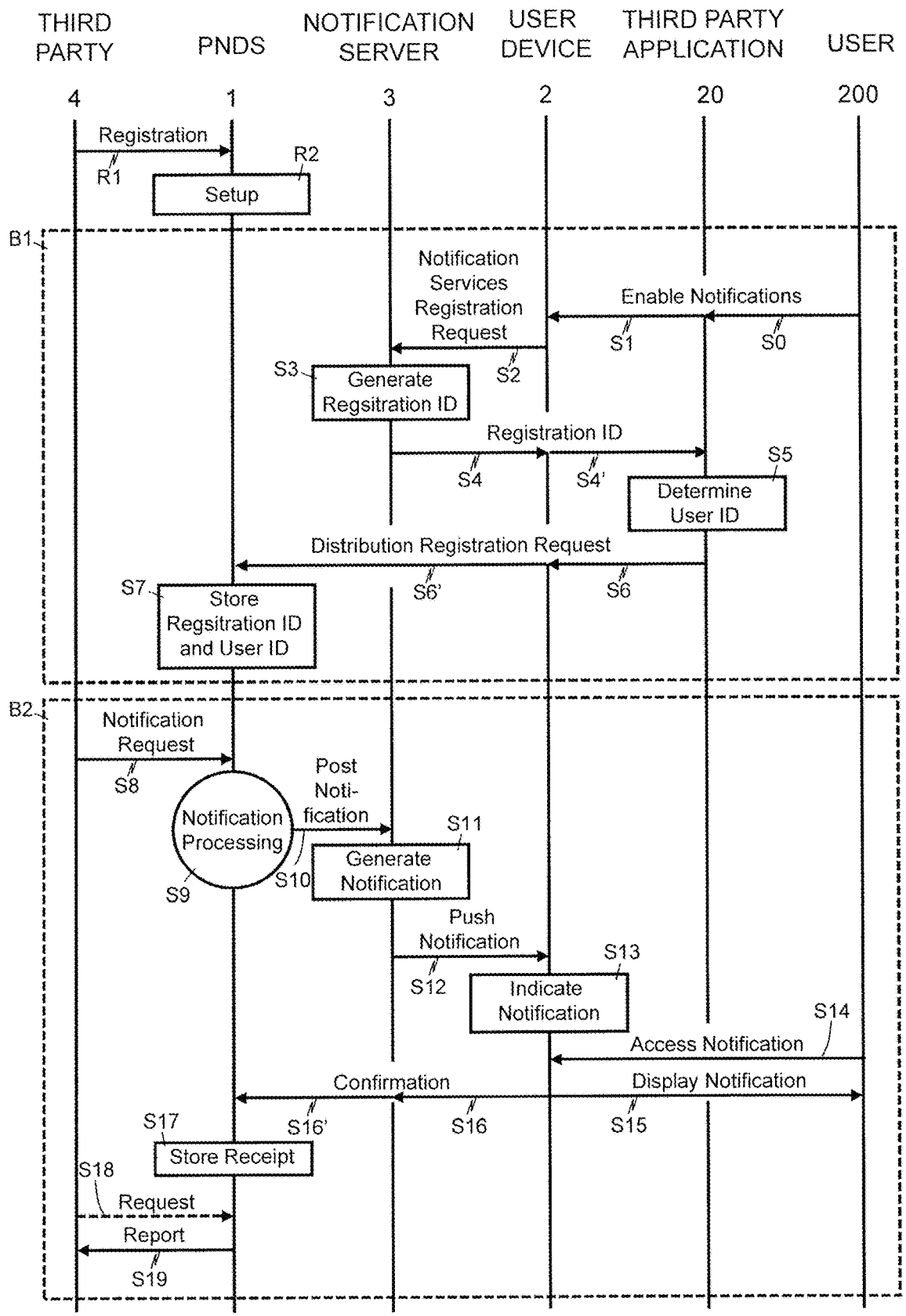
FIG. 2: shows a flow diagram illustrating an exemplary sequence of steps for distributing push notifications from third parties via push notification servers to communication devices of users.

In FIGS. 1 and 2, reference numeral 1 refers to a computerized push notification distribution system (PNDS). The computerized push notification distribution system 1 comprises one or more operable computers having one or more processors 100. As illustrated in FIG. 1, the computerized push notification distribution system 1 further comprises various functional modules which are implemented as programmed software modules including computer program code for controlling the processor(s) 100. The computer program code is stored on non-transient computer readable media which is connected to the processor(s) 100 in a permanent or removable fashion. Specifically, the functional modules include a plurality of third party application servers 11 and a push notification platform 10. The computerized push notification distribution system 1 further comprises a registration database 12 including data storage media and computer program code configured to implement a DBMS (database management system). The computerized push notification distribution system 1 is configured to communicate via a communication network 5 to remote external entities such as user communication devices 2, push notification server 3, and third party computer systems 4.

The communication network 5 includes the Internet and various communication networks connected to the Internet, such as mobile radio networks, e.g. GSM (Global System for Mobile Communication), UMTS (Universal Mobile Telephone System) networks, or other terrestrial or satellite-based mobile radio networks, LAN (Local Area Networks), WLAN (Wireless Local Area Networks), BT (Bluetooth), NFC (Near Field Communication), DSL (Digital Subscriber Lines), and other data communication networks.

Reference numeral 2 refers to communication devices, particularly portable, mobile communication devices, such as laptop or tablet computers, smart mobile phones, smart watches, or other computerized electronic communication devices or personal computers. The communication devices 2 are configured to communicate via communication network 5 with the computerized push notification distribution system 1 and to receive push notifications from the push notification servers 3. As illustrated schematically in FIG. 1, the communication devices 2 comprise one or more third party applications 20, so called apps, configured to run on a processor of the communication device 2.

Reference numeral 3 refers to push notification servers. Each push notification server 3 comprises one or more operable computers having one or more processors. The push notification server 3 are configured to communicate via communication network 5 with the computerized push notification distribution system 1 and with the user communication devices 2. The push notification servers 3 are each configured to implement a different type of push notification service such as Google® Cloud Messaging (GCM), Apple® Push Notification Service, or Windows® Notification Service, for example. Specifically, the push notification servers 3 are configured to receive from the users communication devices 2 or their third party applications 20, respectively, registration requests for push notifications, and to transmit push notifications to registered communication devices 2 or third party applications 20 running thereon, respectively, as will be described below in more detail.

Reference numeral 4 refers to computer systems of third parties who are providers of the aforementioned third party applications 20. The third parties 4 comprise one or more operable computers having one or more processors. The third party computer systems are configured to communicate via communication network 5 with the computerized push notification distribution system 1.

In the following paragraphs, described with reference to FIG. 2, are possible sequences of steps performed for distributing push notifications from third parties 4 to communication devices 2 of users 200.

In preparatory step R1, a third party 4 registers with the computerized push notification distribution system 1. Specifically, in step R1, a registration with registration data is transmitted from the third party computer system 4 via communication network 5 to the computerized push notification distribution system 1. One skilled in the art will understand that there are various ways of transmitting the registration data to the computerized push notification distribution system 1, e.g. by way of a data message, e-mail, through a website, via an online form, etc. The registration data includes identification data of the third party 4 and of a third party application 20 to be registered and supported by the computerized push notification distribution system 1.

In preparatory step R2, the computerized push notification distribution system 1 registers the respective third party 4 and third party application in the registration database 12. In an embodiment, the computerized push notification distribution system 1 sets up a third party application server 3 for the respective third party 4 and the registered third party application, managing multi-platform push notification services for the registered third party application through the push notification platform 10, and optionally hosting application services for the registered third party application.

The sequence of steps performed in block B1 relates to enabling push notification services for a particular third party application 20, and registering a user 200 and its communication device 2 at the push notification platform 10 for push notifications enabled for the respective third party application 20.

In step S0, the user 200 of a communication device 2 enables push notifications for a specific third party application 20 installed on the user's communication device 2.

Responsive to the user enabling push notifications, in step S1, the third party application 20 or the operating system of the communication device 2, respectively, enables the push notification services for the third party application 20.

In step S2, the communication device 2 transmits via communication network 5 a notification services registration request to the push notification server 3 supporting the push notification services for the (operating system and) third party application 20 implemented on the communication device 2. For example, on an Apple® iPhone® the iOS operating system transmits the registration request to the push notification server 3 providing the Apple® Push Notification Service.

In step S3, the notification server 3 generates a push notification registration identifier for the registration request received in step S2.

In step S4, the notification server 3 transmits the push notification registration identifier via communication network 5 to the communication device 2, where it is relayed by the operating system to the third party application 20, in step S4'.

In step S5, the third party application 20 determines a user identifier of the user of the communication device 2, e.g. from a SIM card (Subscriber Identity Module), from another secure element on the communication device 2, or from the user via an interface of the communication device 2.

In step S6, the third party application 20 generates a registration message with a distribution registration request for the computerized push notification distribution system 1. The registration message includes the user identifier and the push notification registration identifier received from the push notification server 3.

In step S6', the registration message is transmitted by the communication device 2 via the communication network 5 to the computerized push notification distribution system 1.

In step S7, at the computerized push notification distribution system 1, the push notification platform 10 stores the push notification registration identifier in the registration database 12 linked to the user identifier and to the respective (registered) third party application 20.

The sequence of steps performed in block B2 relates to submitting a push notification for a particular third party application 20 to the computerized push notification distribution system 1, and distributing the push notification by the push notification platform 10 to the registered communication devices 2 of users 200 registered for the respective third party application 20.

In step S8, a third party 4 transmits a request for a push notification via communication network 5 to the computerized push notification distribution system 1. The push notification requests includes the content or "payload" of the push notification, an identification of the target third party application 20 (unless the respective third party has only one registered third party application, or the push notification is to be sent to all its registered third party applications). Optionally, the push notification request includes an identification of the target recipients (users), if the push notification is to be sent to one or more individually selected users 200, or to one or more defined groups of users 200.

In step S9, the push notification platform 10 performs the push notification processing. Specifically, the push notification platform 10 determines from the registration database 12 the set of all the push notification registration identifiers linked to the respective target third party application 20 and the target users, if applicable. As indicated in Table 1 below, one user (User 1) may have several push notification registration identifiers (PNR-ID 1, PNR-ID 2, . . . , PNR-ID n) linked to a registered third party application (App A), whereby each push notification registration identifier is assigned to a different communication device 2 and/or a different operating system associated with a different notification server 3.

TABLE 1

| Third party application | User | Push notification registration identifier |
|---|---|---|
| App A | User 1 | PNR-ID 1 |
| App A | User 1 | PNR-ID 2 |
| App A | User 1 | . . . |
| App A | User 1 | PNR-ID n |
| App A | User 2 | PNR-ID q |
| App A | . . . | . . . |
| App A | User m | PNR-ID r |
| . . . | . . . | . . . |

In step S10, the push notification platform 10 posts the push notifications for communication by transmitting the content or "payload" of the push notification and the determined push notification registration identifiers to the respective notification server(s) 3. Thus, if the respective third party application is supported on different operating systems with different types of push notification services, the content or "payload" of the push notification is sent with different subsets of the determined push notification registration identifiers to the respective notification servers 3, depending on and respective to the type of push notification service. For example, the push notification registration identifiers generated by Google® Cloud Messaging will be sent to the notification server 3 for Google® Cloud Messaging, those generated by Apple® Push Notification Service will be sent to the notification server 3 for Apple® Push Notification Service, etc. The push notification platform 10 keeps track and stores the content or "payload" of the push notifications posted to the notification server(s), e.g. linked to a respective message identifier and a time stamp.

In step S11, the respective notification server(s) 3 generate(s) a push notification for each of the received push notification registration identifiers. Each push notification includes a message identifier, the push notification registration identifier of the target user communication device 2, and the received content or "payload" of the push notification.

In step S12, the respective notification server(s) 3 transmit(s) the push notifications via the communication network 5 to the communication device 2, as defined by the respective push notification registration identifier included in the push notification.

In step S13, the communication device 2 or its operating system, respectively, indicates the incoming push notification for the third party application 20 to the user 200.

In step S14, the user 200 access the push notification.

In step S15, the communication device 2 or its operating system, respectively, displays the content or payload of the push notification to the user 200.

In step S16, responsive to the user accessing the push notification and the displaying of the push notification to the user, the communication device 2 or its operating system, respectively, generates an access confirmation, which is transmitted from the user device 2 via communication network 5 to the originating notification server 3. The access confirmation includes the message identifier of the accessed push notification, the push notification registration identifier included in the accessed push notification, and a time stamp indicating the time of access. In an embodiment, the access confirmation further includes an electronic signature of the accessed push notification (e.g. an electronic signature generated from the content or "payload" of the accessed push notification using a private key of the respective user).

In step S16', the notification server 3 forwards the access confirmation to the push notification platform 10 of the computerized push notification distribution system 1.

In step S17, the push notification platform 10 stores the access confirmation in the registration database 12. As illustrated schematically in Table 2, the access confirmation is stored as a receipt (Receipt 1, Receipt s, Receipt t, Receipt u) linked to the respective push notification registration identifier (PNR-ID 1, PNR-ID 2, . . . , PNR-ID n) included in the access confirmation, and thus to the respective user (User 1, User 2, . . . , User m).

TABLE 2

| Third party application | User | Push notification registration identifier | Access receipt |
|---|---|---|---|
| App A | User 1 | PNR-ID 1 | Receipt 1 |
| App A | User 1 | PNR-ID 2 | — |
| App A | User 1 | . . . | — |
| App A | User 1 | PNR-ID n | Receipt s |
| App A | User 2 | PNR-ID q | Receipt t |
| App A | . . . | . . . | . . . |
| App A | User m | PNR-ID r | Receipt u |
| . . . | . . . | . . . | . . . |

The stored receipts (Receipt 1, Receipt s, Receipt t, Receipt u) make it possible to determine in the registration database 12 whether and when a particular user (User 1, User 2, . . . , User m) accessed a particular push notification (as defined by the message identifier included in the receipt), and to verify the content or payload of the push notification that was actually accessed by the user (by using the electronic signature included in the receipt and a public key of the respective user, e.g. to compare the content or "payload" of the push notification accessed by the user to the content or "payload" of the push notification posted by the push notification platform 10.

In optional step S18, the third party 4 transmits via communication network 5 a request for a transmission, confirmation or status report to the computerized push notification distribution system 1.

In step S19, the push notification platform 10 transmits via communication network 5 a transmission, confirmation or status report to the third party 4, indicating for one or more push notification requests received from the respective third party 4 the users to which the push notification was transmitted and the status as to whether or not the user accessed the respective push notification.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

What is claimed is:

1. A computer-implemented method performed by a push notification distribution system, the method comprising:
    receiving a registration message from an application installed on a user communication device, the registration message including a push notification service registration identifier and a user identifier, the push notification service registration identifier received by the user communication device from a push notification server via a communication network, wherein each push notification service registration identifier generated by the push notification server is assigned to a different user communication device, the user identifier identifies a user, and wherein each push notification service registration identifier identifies an operating system of the user communication device;
    storing the push notification service registration identifier and the user identifier in association with the application;
    receiving, via the communication network, from a computer system of a provider of the application a message for a push notification to registered user communication devices; and
    for each push notification service registration identifier stored in association with the application, transmitting to the push notification server associated with the operating system of the user communication device, a request to transmit a push notification to the registered user communication devices, each request to transmit including the message and the respective push notification service registration identifier;
    said method performed by execution of program code by one or more processors of the push notification distribution system.

2. The method of claim 1, further comprising:
    receiving, from the push notification server, access confirmations indicative of user access to a push notification, each access confirmation including the push notification service registration identifier included in the push notification accessed by a user; and
    storing, for the push notification accessed by the user, a notification receipt for the user identifier linked to the push notification service registration identifier.

3. The method of claim 2, wherein the push notification distribution system stores notification receipts for at least one of: a plurality of users, a plurality of applications, and a plurality of application providers.

4. The method of claim 1, wherein the push notification distribution system receives registration messages from the application installed on a plurality of communication devices, and transmits to the push notification server a plurality of requests for transmitting the push notification to the plurality of communication devices.

5. The method of claim 1, wherein the push notification distribution system receives registration messages from a plurality of different applications installed on the user communication device.

6. The method of claim 1, wherein the push notification distribution system receives message contents from a plurality of entities for push notifications to users of respective applications provided by the entities.

7. The method of claim 1, wherein:
    the user communication device receives push notification service registration identifiers from a plurality of push notification servers, responsive to a user activating push notifications for the application installed on the user communication device;
    the application installed on the user communication device includes in the registration message to the push notification distribution system a plurality of push notification service registration identifiers received;
    the push notification distribution system stores the plurality of push notification service registration identifiers linked to the user identifier and the application; and
    the push notification distribution system transmits the request for transmitting the push notification to the plurality of push notification servers, for each notification service registration identifier linked to the application.

8. A computerized push notification distribution system comprising one or more processor configured to execute a process comprising:
    receiving, from an application running on a user communication device, a registration message, the registration message including a push notification service registration identifier from a push notification server and a user identifier, wherein each push notification service registration identifier generated by the push notification server is assigned to a different user communication device, the user identifier identifies a user, and wherein each push notification service registration identifier identifies an operating system of the user communication device;
    storing the push notification service registration identifier and the user identifier linked to the application;
    receiving a submission of message content for a push notification to registered user communication devices; and
    generating and transmitting to the push notification server associated with the operating system of the user communication device, a request for transmitting a push notification to the registered user communication devices, the request including the message content the push notification service registration identifier.

9. The computerized push notification distribution system of claim 8, wherein the process further comprises receiving, from the push notification server, an access confirmation indicative of user access to the push notification, the access confirmation including the push notification service registration identifier.

10. The computerized push notification distribution system of claim 8, wherein the process further comprises receiving registration messages from instances of the application installed on a plurality of communication devices, and to transmitting to the push notification server a plurality of requests for transmitting the push notification to the plurality of communication devices.

11. The computerized push notification distribution system of claim 8, wherein the process further comprises receiving registration messages from a plurality of different applications installed on the user communication device.

12. The computerized push notification distribution system of claim 8, wherein the process further comprises receiving message contents from a plurality of entities for push notifications to users of respective applications of the plurality of entities.

13. The computerized push notification distribution system of claim 8, wherein the process further comprises storing notification receipts for at least one of: a plurality of users, a plurality of applications, and a plurality of application providers.

14. The computerized push notification distribution system of claim 8, wherein the process further comprises:

receiving from the application running on the user communication device a plurality of push notification service registration identifiers;

storing the plurality of push notification service registration identifiers linked to the user identifier and the application; and transmitting the request for transmitting the push notification for each push notification service registration identifier linked to application.

15. A user communication device comprising a processor configured to execute a process comprising:

activating push notifications for an application installed on the user communication device in response to an activation action by a user;

transmitting, to a push notification server associated with an operating system of the user communication device, a message indicating activation of the push notifications for the application installed on the communication device;

receiving, from the push notification server, a push notification service registration identifier, responsive to the activation of the push notifications for the application;

transmitting, by the application installed on the user communication device, a registration message to a computerized push notification distribution system, the registration message including the push notification service registration identifier and a user identifier of the user, wherein each push notification service registration identifier generated by the push notification server is assigned to a different user communication device, the user identifier identifies a user, and wherein each push notification service registration identifier identifies the operating system of the user communication device; and receiving from the computerized push notification distribution system a push notification for the application, the push notification including a message received by the computerized push notification distribution system for users of the application who have activated push notifications for the application and have registered at least one user communication device with the push notification server.

16. The communication device of claim 15, wherein the process further comprises transmitting, to the computerized push notification distribution system, an access confirmation, responsive to the user accessing a push notification, the access confirmation including the push notification service registration identifier.

\* \* \* \* \*